United States Patent
Shah et al.

(10) Patent No.: US 6,662,174 B2
(45) Date of Patent: Dec. 9, 2003

(54) ANALYTICAL SERVER INCLUDING METRICS ENGINE

(75) Inventors: Arun Shah, Saratoga, CA (US); Robert F. Novy, Redwood City (JP)

(73) Assignee: Brio Software, Inc., Santa Clara, CA (US)

(*) Notice: Subject to any disclaimer, the term of this patent is extended or adjusted under 35 U.S.C. 154(b) by 331 days.

(21) Appl. No.: 09/837,114

(22) Filed: Apr. 17, 2001

(65) Prior Publication Data

US 2002/0059267 A1 May 16, 2002

Related U.S. Application Data

(60) Provisional application No. 60/197,894, filed on Apr. 17, 2000, and provisional application No. 60/199,975, filed on Apr. 27, 2000.

(51) Int. Cl.[7] .............................................. G06F 17/30
(52) U.S. Cl. .......................................... 707/2; 707/102
(58) Field of Search .................................. 707/2, 102

(56) References Cited

U.S. PATENT DOCUMENTS

| | | | |
|---|---|---|---|
| 5,884,299 A | 3/1999 | Ramesh et al. | |
| 5,899,992 A | 5/1999 | Iyer et al. | |
| 5,905,985 A * | 5/1999 | Malloy et al. | 707/100 |
| 5,926,818 A | 7/1999 | Malloy | |
| 5,983,227 A | 11/1999 | Nazem et al. | |
| 5,991,756 A | 11/1999 | Wu | |
| 6,032,144 A | 2/2000 | Srivastava et al. | |
| 6,078,926 A | 6/2000 | Jensen et al. | |
| 6,161,103 A * | 12/2000 | Rauer et al. | 707/4 |
| 6,163,774 A | 12/2000 | Lore et al. | |
| 6,199,063 B1 * | 3/2001 | Colby et al. | 707/4 |
| 6,205,469 B1 | 3/2001 | Graham | |
| 6,212,515 B1 * | 4/2001 | Rogers | 707/2 |
| 6,212,524 B1 | 4/2001 | Weissman et al. | |
| 6,282,544 B1 | 8/2001 | Tse et al. | |
| 6,327,574 B1 | 12/2001 | Kramer et al. | |
| 6,366,922 B1 * | 4/2002 | Althoff | 707/103 R |
| 6,377,993 B1 * | 4/2002 | Brandt et al. | 709/227 |
| 6,385,201 B1 | 5/2002 | Iwata | |
| 6,385,604 B1 * | 5/2002 | Bakalash et al. | 707/3 |
| 6,439,699 B1 | 8/2002 | Silverbrook | |
| 6,480,836 B1 * | 11/2002 | Colby et al. | 707/3 |
| 6,484,179 B1 * | 11/2002 | Roccaforte | 707/102 |
| 6,505,205 B1 | 1/2003 | Kothuri et al. | |
| 6,542,895 B1 * | 4/2003 | DeKimpe et al. | 707/101 |
| 6,556,983 B1 * | 4/2003 | Altschuler et al. | 706/55 |
| 2002/0029207 A1 | 3/2002 | Bakalash et al. | |

FOREIGN PATENT DOCUMENTS

| | | |
|---|---|---|
| WO | WO99/57658 | 11/1999 |
| WO | WO 99/57658 A | 11/1999 |
| WO | WO00/20982 | 4/2000 |
| WO | WO 00/20982 A | 4/2000 |

* cited by examiner

*Primary Examiner*—Wayne Amsbury
(74) *Attorney, Agent, or Firm*—Baker & McKenzie

(57) ABSTRACT

Disclosed is a method for determining database queries to be sent by an analytical server to a Relational Dababase Monitoring System (RDBMS) by using hierarchical level metadata to describe the various structures within the database.

8 Claims, 5 Drawing Sheets

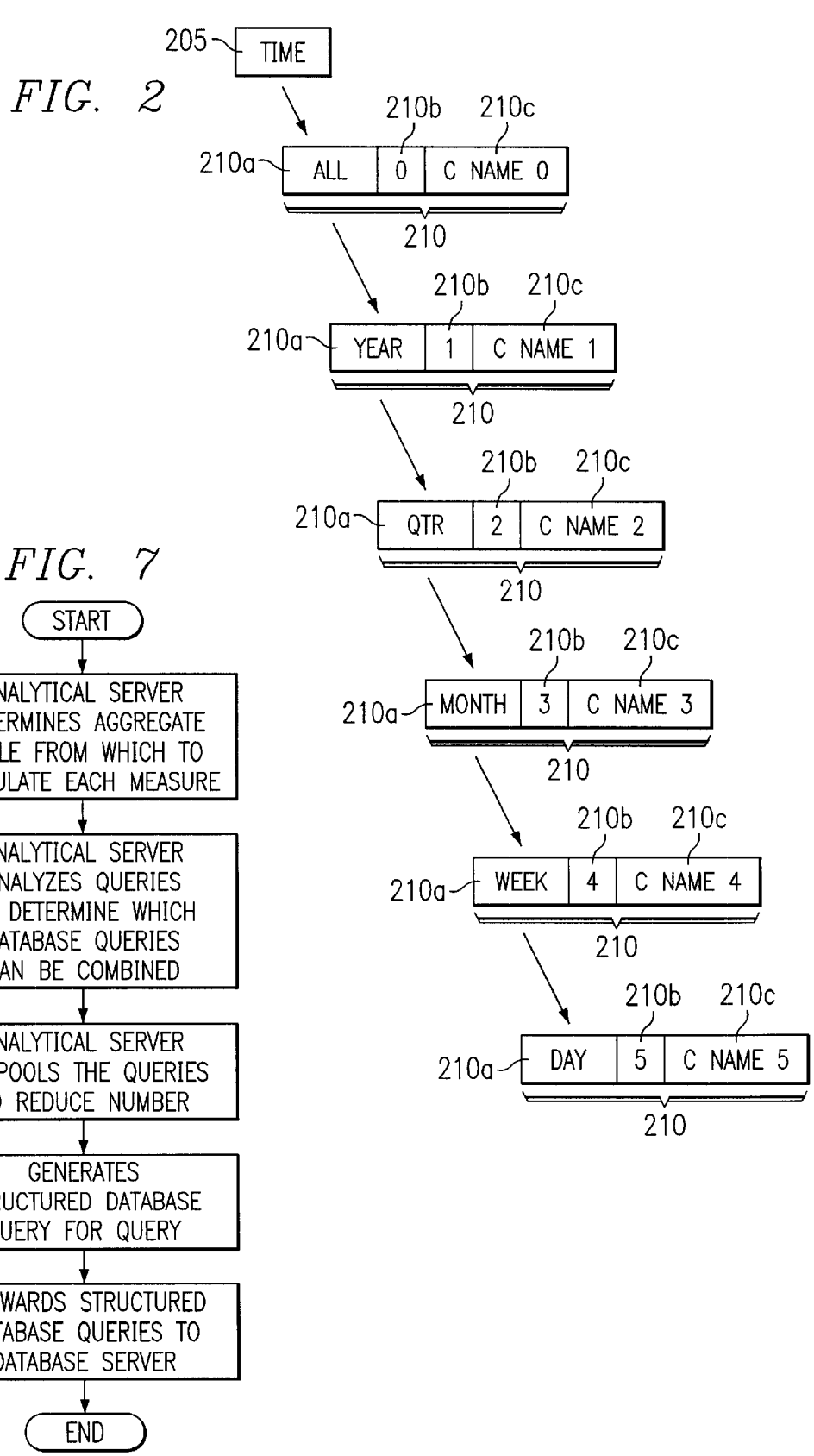

ANALYTICAL SERVER INCLUDING METRICS ENGINE

RELATED APPLICATIONS

This application depends and claims priority from U.S. Provisional Patent Application No. 60/197,894 (filed Apr. 17, 2000) and No. 60/199,975 (filed Apr. 27, 2000), which are hereby incorporated by reference herein.

TECHNICAL FIELD

The embodiments disclosed and claimed herein are related to computer systems, and more particularly, databases.

TECHNICAL BACKGROUND

Today's businesses have sophisticated data analysis requirements. The metrics or analyses of a business's data can be difficult to obtain. To calculate a meaningful metric, business analysts often use spreadsheets to manually analyze data. Manual analysis, of course, is a tedious and time-consuming process.

Most applications fail to deliver useful metrics that provide unique insights into an organization's performance. Useful metrics highlight significant performance measures of the business. Typically, business analysts must execute multiple queries and other time-consuming manual interventions to produce these metrics. Then, despite the time-consuming effort, analysts must start the process anew to obtain follow-up information such as an explanation of a particular anomaly in a metric.

Typically, a business's data is stored on a database or on databases. These databases are operated with associated database servers, which manage the storage and retrieval of records from the databases. Analytical servers have additionally been provided to format database queries or information requests sent from a client user interface to the database server for handling. The analytical servers can be used to improve the efficiency of the database accesses and to provide metrics of interest to the user from the retrieved records from the database.

SUMMARY

The embodiments disclosed below provide an analytical server which efficiently accesses a Relational Database Monitoring System ("RDBMS") comprising a database and a database server. The database in this approach includes fact and dimension tables which may be, for example, configured in a star schema having a central fact table with surrounding dimension tables to form the star structure. Aggregate tables may also be provided which aggregate measures from the fact table at a higher hierarchical level than such measures are maintained in the fact table. Metadata is further stored in the database, where the metadata describes the organization of the various tables in the database, and specifically the metadata in the embodiments described below includes information about the hierarchical levels of various dimensions of the above-mentioned tables and star schema.

With further reference to the metadata stored in the database in the below-described embodiments, the analytical server described herein receives the metadata from the database and analyzes that metadata, including the hierarchical information, in order to provide relatively efficient access to the tables of the database in response to a query from a user. Such efficient access preferably supports calculation of complex metrics which might otherwise be difficult or impossible. Supported levels of stars are defined and analyzed in a sophisticated and efficient manner which facilitates the calculation of chameleon and allocated metrics. Additionally, fact level security and dimensional security are supported, as well as efficient collection and analysis of aggregate table usage statistics.

BRIEF DESCRIPTION OF THE DRAWINGS

FIG. 2 is a block diagram of a metadata structure for a hierarchy;

FIG. 7 is a flow diagram describing carpooling;

DETAILED DESCRIPTION

Figure 1:
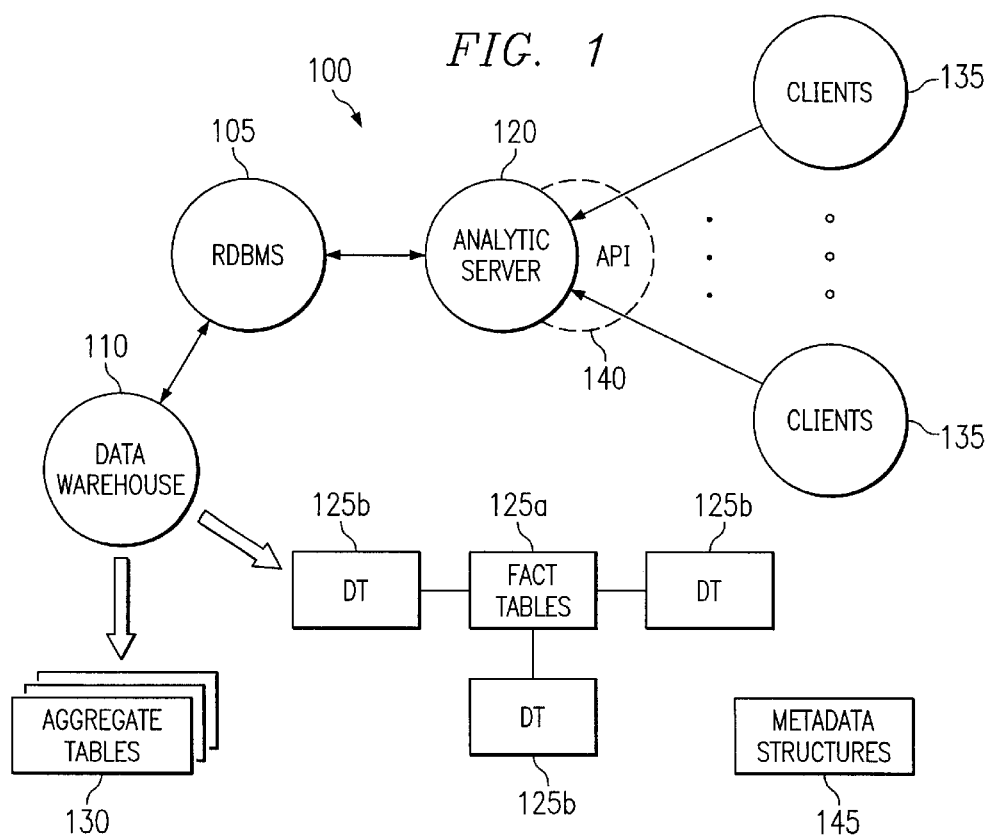
FIG. 1 is a block diagram describing an exemplary computer architecture.

Referring now to FIG. 1, there is illustrated a block diagram describing an exemplary computer architecture 100, configurable in accordance with an embodiment of the present invention. The computer architecture 100 comprises a relational database management system (RDBMS) 105, a database or data warehouse 110, an interface 115, and an analytical server 120.

The database 110 is accessible by the analytical server engine 120. The analytical server engine 120 accepts requests for metric calculations from clients 135, uses the metadata structures 145 to identify the necessary fact components and the best star schema for accessing them, generates and executes structured queries in a database query language, such as Structured Query Language (SQL), performs outer joins to conform query results, calculates the desired metrics, and returns them to the clients in a structured form such as a multidimensional cubes.

The clients access the analytical server via an application programming interface (API) 140, through which metrics can be requested, possibly constrained on dimensional values. The query and metric calculation results are transmitted through the interface as objects. The client need not have knowledge of how the metric is calculated.

The database 110 includes a collection of fact tables 125a and dimension tables 125b organized in multiple star schemas 125. Exemplary star schemas are described in Ralph Kimball, THE DATA WAREHOUSE TOOLKIT (John Wiley & Sons 1996), which is hereby incorporated by reference for all purposes. Additionally, the database includes aggregate tables 130. The aggregate tables 130 contain values summarized from the fact tables 125a to certain specified levels of one or more dimensions. An aggregate table 130 is more efficient and preferable to access than a fact table 125a, provided the level of detail of a given aggregate table 130 is still sufficient for a given query.

Additionally, a set of metadata structures 145 describe the contents of, and relationships between, the various fact and dimension tables 125a,125b.

The metadata structures 145 provides information for the analytical server 120 to determine how to access the database 110 for the values required to construct requested metrics and defines more abstract constructs, such as particular metrics which can be computed from one or more facts in the database 110. As will be described below, the metadata structures 145 include structures for hierarchies, stars, measure indicators, and metric indicators.

I. Metadata Structures

A. Hierarchies

Referring now to FIG. 2, there is illustrated a block diagram of a metadata 145 structure known as a hierarchy 205. A hierarchy 205 defines levels 210 with a minimum of two levels. The top level encompasses all elements, while successive levels further subdivide the elements into one or more non-overlapping groups.

Each level 210 is associated with a level name 210a, level number 210b, and column name 210c. The level names describe the grouping of the elements. In the exemplary case described in FIG. 2, the level names include "all," "year," "quarter," "month," "week," and "day." The level number 210b starts with 0 for the top level 210 and increases sequentially for each deeper level. The column name 210c is used to find the attribute values for the level in any table in the database which supports the hierarchy. For example, the column name 210c for the "quarter" level 210b may be used to find the attributes specifying the quarters of a particular database year.

For a dimension table 125b to be associated with a hierarchy 205, the dimension table 125b must contain the column names 210c specified for the hierarchy 205 for the levels 1 . . . n. Multiple dimension tables 125b may be associated with the same hierarchy 205 and support it to different levels. For example, a dimension table 125b for Time might contain columns only for Year, Quarter, and Month, and therefore provided a supported level of "3," while a more complete dimension table might contain columns for all levels down to "day," and therefore offer a supported level of "5."

B. Stars

Figure 3A:
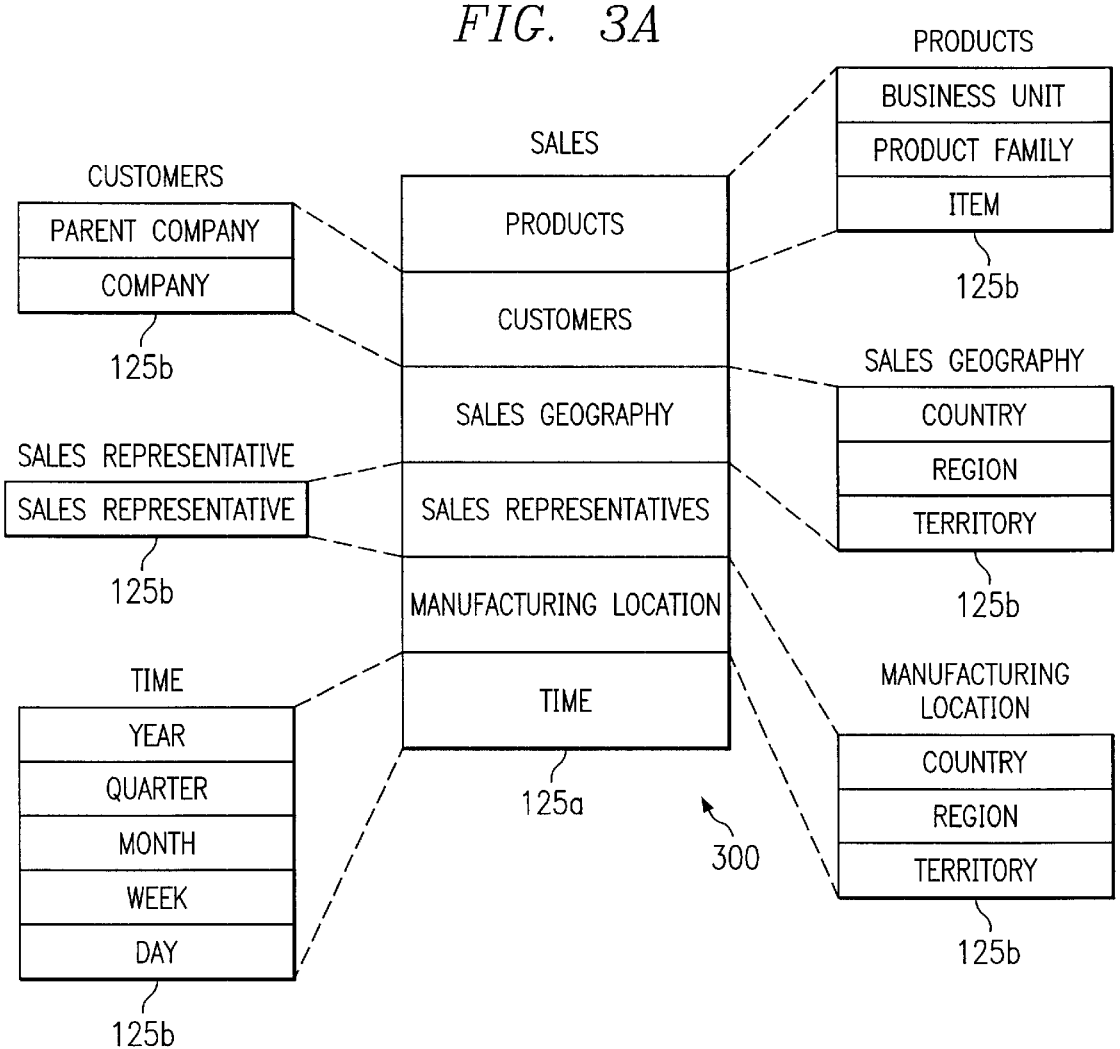
FIG. 3A is a block diagram describing a star schema.
Figure 3B:
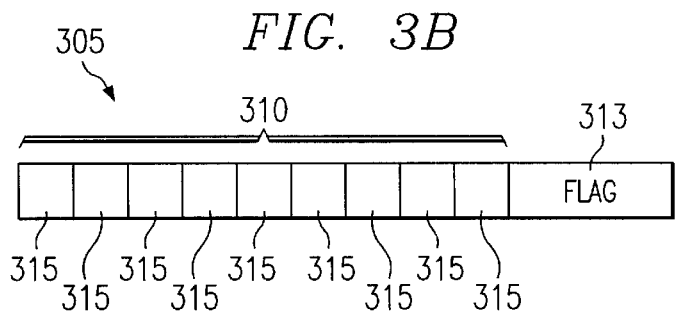
FIG. 3B is a block diagram of a metadata structure for a star.

FIG. 3A illustrates a star schema dimensional model, and FIG. 3B provides is a block diagram of an exemplary metadata structure for a single star within the database.

As shown in FIG. 3A, a star 300 has a single fact table 125a having a number of records along multiple dimensions, which dimensions in turn point to corresponding dimension tables 125b. As shown in FIG. 3A, the fact table 125a, for example, may be a "Sales" fact table, which may in turn have facts in six defined dimensions: Products, Customers; Sales Geography; Manufacturing Location; Sales Reps; and Time. These dimensions will in turn refer to the dimension tables 125b, which may be conceptually viewed as surrounding the fact table 125a. Exemplary hierarchical levels maintained within the dimension tables 125b are also shown in FIG. 3A.

The star 300 comprising the fact table 125a and the surrounding dimension tables 125b can be used to apply selection constraints and specify aggregate groupings when retrieving the fact values. A number of different stars can be identified in a database.

A star metadata structure 305 such as shown in FIG. 3B can be used to describe the various stars in a database. Each star metadata structure 305 identifies an aggregate table 130 in the database from which values designated as facts may be obtained. For each supported hierarchy 205 (see FIG. 2), the star 300 identifies a specific dimension table 125b to be used for performing hierarchical selection and grouping, and provides to the querying language (such as SQL), a constraint used to join the dimension table 125b to the fact table 125a.

The supported levels of the specific aggregate table 130 in the database are represented in a star metadata structure 305 by an array 310 of integers in which elements 315 of the array 310 represent the supported hierarchical levels defined in a predetermined order. Additionally, an initialization process might ensure that the supported levels 210 are valid in all stars 300, thereby eliminating the need for checking the column names during the star selection process.

Still referring to FIG. 3B, within each star metadata structure 305, a supported level 210 value is tracked for each dimension, specific to the star 300 and usually depending on the level 210 of data aggregation in the associated aggregate table 130. For example, in FIG. 3A, the time dimension has been summarized to the "day" level, so the supported level 210 for Time in this particular star 300 will be "5," while some other star containing only month-level fact values would support Time to level 3. If no dimension table 125b has been assigned for some hierarchy 205, then hierarchy 205 is not supported by the star 305 and the supported level is recorded as "0."

The star metadata structure 305 may also include a flag 313 indicating the availability of the star 300. Where the star is properly maintained or refreshed by some other mechanism, the flag 313 can be set to indicate whether the star is available. The foregoing flag 313 can be examined during star selection.

The stars 300 are collected into groups called stargroups. Aggregate tables 130 are built for frequently accessed data, in a manner that reduces table size, join complexity, a query time. For example, sales figures might be accumulated at the "day" level in one aggregate table 130, and summarized more highly to the "month" level in some other aggregate table 130. The stargroup used for accessing sales figures might contain two stars 300, possibly using exactly the same dimension tables 125b but each pointing to different aggregate tables 130. The star 300 using the monthly aggregate fact table 130 would be assigned a higher aggregate rank, or in other words would contain measures at a higher hierarchical level, and would be preferred when values were not required at a finer grain than month.

C. Measure Indicator

Figure 4:
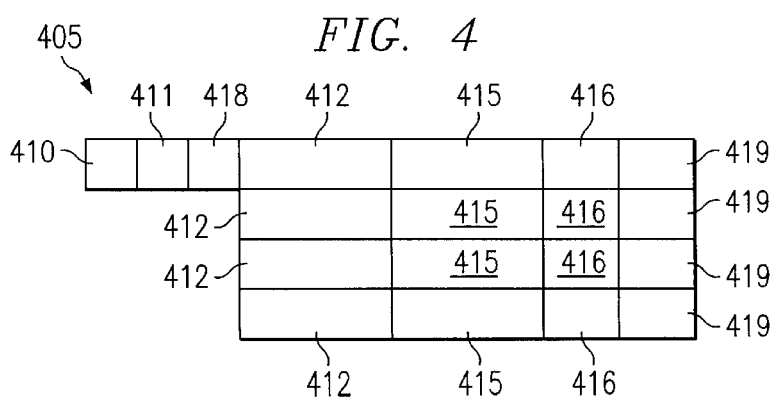
FIG. 4 is a block diagram of a metadata structure for a measure indicator.

Referring now to FIG. 4, there is a block diagram of another metadata structure 145, specifically a measure indicator 405. The measure indicator 405 identifies and describes a measure, which is a value that can be obtained directly from the database 110.

The measure indicator 405 includes an identifier 410, which identifies the facts within the database 110 that are being referred to. Also included in the measure indicator is a flag 411 which indicates whether or not the measure is additive. The measure indicator 405 also contains a query language snippet 412. To support aggregate navigation, the snippet 412 is defined using a syntax which allows substitution of specific fact table 125a names and dimension table 125b names. For example, a non-SQL character is used to delimit a substitutable form which is to be replaced by the name of the fact table in the associated star, prior to executing a query.

Additionally, different stargroups may require that the snippet 412 be written differently. Accordingly, a measure may contain a plurality of snippets 412, each associated with an indicator 415 indicating a particular stargroup. Verification that the columns specified in the snippets 412 actually appear in the aggregate tables 130 defined by each star 300 in the associated stargroup can be done during an initialization process, thereby limiting column name lookups.

A measure also may be semi-additive which means additive in some dimensions and not additive in others. Inventory levels, for example, may be additive in the product dimension but non-additive in the time dimension. To accommodate queries of measure across different dimensions and to properly account for the varying additive/non-additive properties of measures in different dimensions, a second "additivity" flag may be provided at 416, which might for example, be associated with the snippet/stargroup 412/415 pairing. In this approach, the measure 405 could be indicated as "non-additive" but could then be separately indicated as "additive" for a particular snippet by flag 416. Conversely, such semi-additivity could be indicated by a positive "additivity" indicators by particular snippet in flag 416. The use of these additivity flags will be discussed in the section below relating to non-additive measures and metrics.

Use of multiple snippets 412 for different stargroups are advantageous for calculation of chameleon metrics. Chameleon metrics represent a general concept, the exact definition or calculation of which is dependent on the dimension or level. For example, a cost metric when viewed by the product dimension, may measure production or part cost. However, when viewed by dimensions other than product, the cost include the total product cost across all parts, freight, taxes, and other top-level costs.

Chameleon metrics are constructed by taking advantage of the provision for multiple snippet 412/stargroup pairs in the underlying measure definitions. Using the Geography vs. Product forecast example, a measure is defined which uses two different stargroups. The snippet 412 associated with the first stargroup can cause the measure to be calculated in accordance with a first definition while the snippet 412 associated with the second definition cause the measure to be calculated in accordance with a second definition.

Fact-based security can also be provided, for example, by providing additional security hierarchy fields 418, 419 within the measure indicator 405. By defining for particular measures a security hierarchy, it is possible to grant access to particular users or clients according to levels of fact-based data by defining security hierarchy levels on a measure-by-measure basis. For ultimate flexibility, the security hierarchy is defined in the measure indicator both at the broad level in field 418 and at the specific snippet level 419. The definition at these different levels allows the facts to be accessed according to the measure's use within the star structure 300 or aggregate table 130 being accessed rather than just having a broad prohibition of accessing certain types of data by certain users or clients.

D. Metric Indicators

Figure 5:
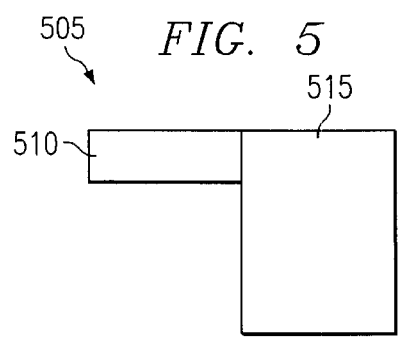
FIG. 5 is a block diagram of a metadata structure for a metric indicator.

Referring now to FIG. 5, there is illustrated a block diagram describing a metric indicator 505. The metric indicator 505 includes a metric name 510 identifying a particular metric. The metric name 510 is used in requesting results from the analytical server 120. The metric indicator 505 also includes identifiers 515 identifying measures and the operations to be performed thereon, to calculate the value of the metric. Although the measures are obtained from the database 110 from any number of database queries, the metrics are calculated at the analytical server 120 after obtaining each measure.

II. Metric Calculation

A. Aggregate Navigation

Figure 6:
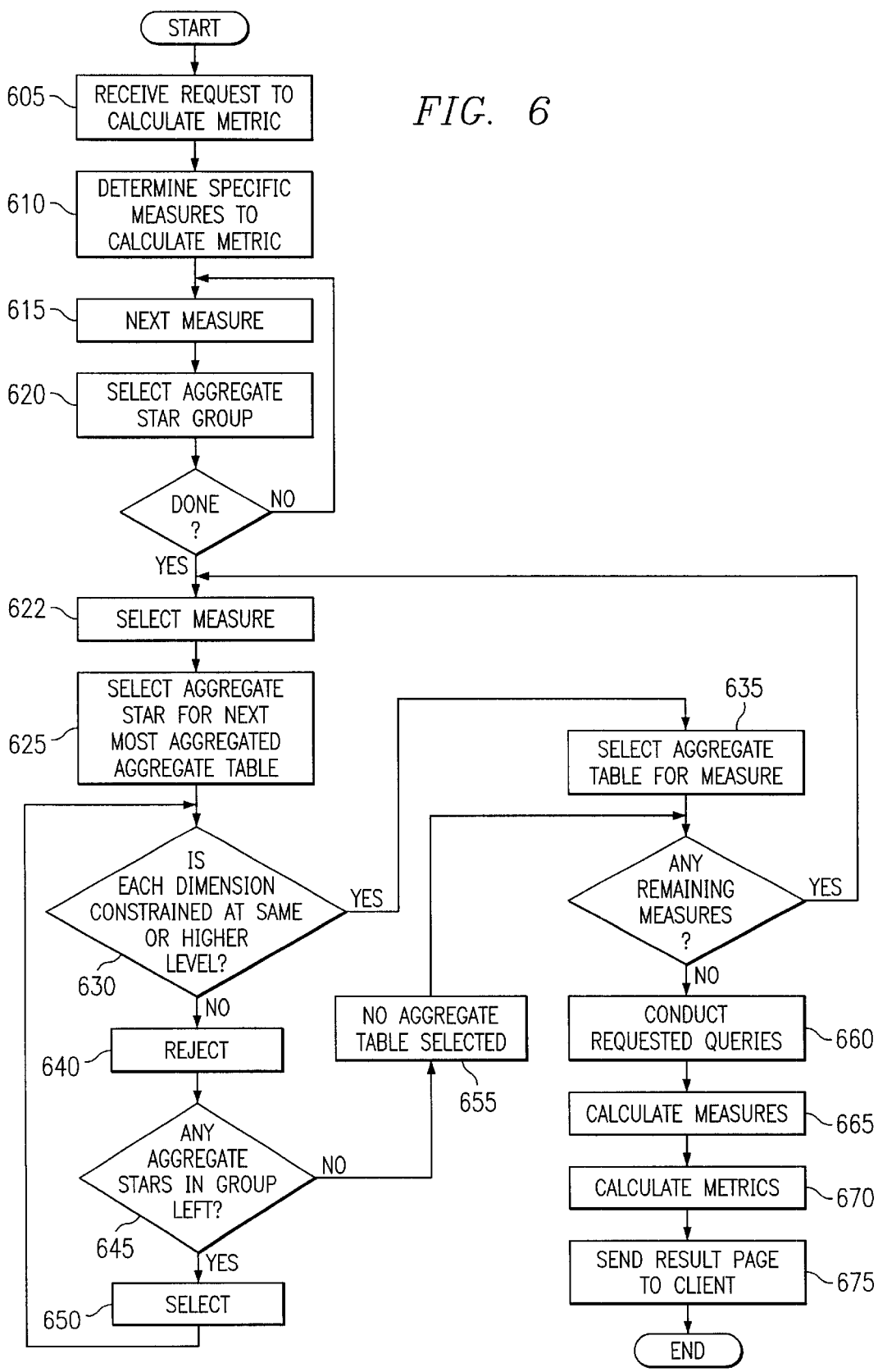
FIG. 6 is a flow diagram describing calculation of a metric.

Referring now to FIG. 6, there is illustrated a flow diagram describing the calculation of a metric at an analytical server 120. At step 605, the analytical server 120 receives a request to calculate a particular metric. After receiving the request to calculate the particular metric, the analytical server 120 determines the specific measures required for calculating the metric from the metric indicator 515 (step 610). For each measure (step 615), the analytical server 120 selects the aggregate stargroup (step 620).

At step 622, the analytical server 120 selects a particular measure and associated stargroup. Within the aggregate stargroup, the analytical server 120 selects (step 625) the star 300 associated with the most highly aggregated aggregate table 130 and determines whether the aggregate table 130 supports each constrained dimension at the level required. The foregoing is measured by comparing (step 630) the level that each dimension is constrained in the metric request with the array 310 describing the supported levels 210 of the dimensions. Wherein the array 310 indicates that each constrained dimension is supported at the same or higher level, the aggregated table 130 associated with the star 300 is selected (step 630).

Wherein one or more constrained dimensions are not supported, or supported at a lower level, the aggregate table 130 associated with the star 300 is rejected (step 635), and a determination is made whether any remaining stars 300 are present in the stargroup. Wherein a remaining star 300 exists in the stargroup, the star 300 associated with the next most highly aggregated table 130 is selected (step 650) and steps 630–650 are repeated. Wherein there are no remaining stars 300, no aggregate table 130 is selected (step 655) for the particular measure and calculation of the measure must be conducted by querying the database 110. Steps 622–655 are repeated for each measure required for the requested metric (s).

After selecting the aggregate table 130, the analytical server 120 generates and conducts the queries for each measure on the selected aggregate table 130 (step 660). The queries are generated by substituting the fact 125*a* and dimension table 125*b* names where indicated in the snippets 412 associated with the selected star 300. After generating the queries, the analytical server 120 calculates the measures (step 665), calculates the metrics (step 670), and forwards the result to the client (step 675), thereby completing calculation of the metric.

The foregoing approach also permits maintenance of statistics which indicate the usage levels of each star 300. For example, statistics can monitor events such as when a star 300 is considered for selection and rejected, a star 300 is selected for use, and when a star 300 is actually used in a query. The required and supported hierarchical levels can also be recorded, thereby permitting examination of usage levels. From the foregoing information, it can be determined in a given circumstance that an additional level of detail should be added to the aggregate table 130 because a majority of requests required the additional hierarchical level. Additionally, a determination can be made that the aggregate table 130 can be consolidated without major effect on overall performance because a majority of requests require one less level of aggregation.

B. Carpooling

Certain queries can be conducted using a common aggregate table 130. For example, certain aggregate tables 130 can include multiple aggregated facts. Wherein multiple queries request different measures, but with identical constraints, the aggregated facts can be combined into a single structured query, such as a SELECT statement in SQL. Alternatively, where in multiple queries, all but one constraint are identical, and the different constraint is constrained at the same level, the queries can also be combined.

The foregoing is known in the art as carpooling. The analytical server 120 can advantageously preprocess the requisite queries, possibly allowing a number of queries to be combined into a single query, resulting in relational database 110 access efficiencies.

Referring now to FIG. 7, there is illustrated a flow diagram describing the operation of the analytical server 120 conducting queries, wherein the queries may be combined due to there being a number of queries seeking metrics along the same dimension broken down, preferably, to the same hierarchical level. The combining of the queries reduces database load and in many cases improves database response time.

At step 705, the analytical server 120 determines the aggregate table 130 from which to calculate each measure. At step 707, the analytical server determines which of a plurality of queries can be combined when accessing the database 110. In order to combine queries, the same fact table 125a is common between the queries to be combined, and there will be commonality to at least some of the dimension tables 125b between the queries as well. The queries can be combined for a single star or among a number of stars 300, so long as there is the requisite commonality among the fact and data tables 125a–b. The determination of step 707 involves a determination of the hierarchical levels involved in the plurality of queries, and it is possible that even if a requested metric or metrics requires the same measures but at differing hierarchical levels, it may be possible to consolidate these into a single query of the database 110 and then extract the desired information needed for the different metric requests. For example, if some metric is broken down over the last six months and also for the corresponding six months in the previous year. The underlying measure for both requests can be obtained in a single query, simply by placing all desired month numbers in the "IN (l, m, n)" constraint, and selectively processing the results.

At step 710, the analytical server 120 carpools combinable queries to reduce the number of queries actually made of the database 110 through the RDBMS 105. After carpooling the queries, the analytical server 120 generates the structured query commands for each of the database queries (step 715) and forwards (step 720) the structured database query commands to the RDBMS 105.

C. Non-Additive Metric Calculation

It is noted that it is often desirable to display metrics broken down across dimensional levels, and simultaneously display a roll-up or total. Provided all the measures that have been broken down across dimensional levels are additive, the requester of the metric can simply total the returned results. However, this is incorrect wherein certain measure components of the metrics are non-additive. Correct totals can only be obtained if the requester has knowledge of which measures are non-additive and asks for the non-additive measures separately.

By using the additive/non-additive fields 411,416 described with respect to FIG. 4, it is possible for the analytical server 120 to readily determine which measures are non-additive. By making this determination, the analytical server can allow the rollup to be handled transparently without making the non-additive attributes visible to the requester. This is accomplished by extending the metric result to contain an additional multidimensional array of totals. The additional multidimensional array of totals may include or be based upon measures at different hierarchical levels than were necessary for the original (non-rollup) calculation. Maintaining metadata 145 describing the hierarchical levels of the aggregate tables 130 allows for an efficient implementation of the transparent non-additive metric calculations described above.

Figure 8:
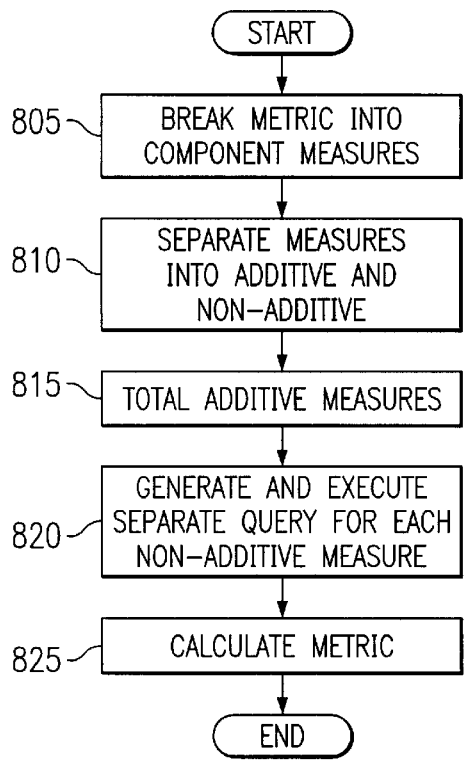
FIG. 8 is a flow diagram describing a rollup of a metric.

Referring now to FIG. 8, there is illustrated a flow diagram describing a rollup of a metric. At step 805, the metric is broken down into its component measures. At step 810, the component measures are separated into two groups or are conceptually treated as two groups, according to the additive/non-additive flags 411,416 (see FIG. 4). To the extent the rollup can be done for the additive measures without additional difficulty, this summing is done at step 815.

At step 820, a separate totals query is generated for each non-additive measure. The query is launched using the stars as described above, and it is noted that the totals query typically requires a shallower hierarchical level on at least one dimension. Accordingly, the totals query may actually be obtained using a more highly aggregated table. Finally, at step 825, the metric is calculated and the process is terminated. In the foregoing manner, complex metrics composed of any combination of additive and non-additive measures can be calculated correctly and efficiently, without requiring any knowledge or action on the part of the requester.

As an example, using the additive/non-additive fields 411,416, the analytical server 120 knows which measures are non-additive. Accordingly, the handling of the non-additive measures can be handled transparently, without making the non-additive attribute visible to the requester. This minimizes the chances of displaying invalid results.

To accomplish the non-additive roll-up, the analytical server 120 extends the metric result object to contain an additional multidimensional array of totals. So for example if there were a requested metric relating to monthly sales of product by business unit, the request would be for a three-dimensional cube (business unit×month×metric values). If the sales were not additive across the product dimension a separate two-dimensional array would be requested and returned (as just month×metric values), with the values representing the totals across all business unit. Alternatively, the original three-dimensional cube might simply reserve one extra element in the first dimension to contain the totals.

In the simple case where it turns out all component measures are additive, the analytical server 120 issues queries at the detail level only (business unit), and performs simple sums to calculate the totals. The individual measures are summed, and then the metric level calculations are performed using these sums. The important thing in the specific example is to average the totals rather than totaling averages.

When a measure is non-additive, the analytical server 120 instead generates and issues two separate queries, the extra query being for the total level (omitting the SELECT item and GROUP BY for Business Unit). In this way, complex metrics composed of any combination of additive and non-additive measures can be calculated correctly and efficiently, without requiring any knowledge or action on the part of the requester. The additive/non-additive fields 411, 416 (see FIG. 4) are provided within the measure metadata structure to assist the analytical server 120 in determining whether certain measures or additive or not along certain dimensions.

As an additional benefit, there may be cases where no star is available at a certain hierarchical level, in which case the analytical server 120 may attempt to obtain the measures and calculate the metric at the total level only (even in the case where the measures are all additive). This can be done, for example, when the intention is to compare two metrics, such as sales vs. forecast, as when sales can be broken down by industry, customer, etc. but forecast is only available by product. In this case, forecast could still be compared to total sales across all industries or customers. To best support this capability, the server further extends the result object to provide indicators distinguishing such indicators as "all zero results", "no data found", "detail level not supported", and so forth.

D. Cross Star Joins

Many metrics must be calculated using measures obtained from different stars. For example, a metric which measures the days that inventory is on hand might be calculated by measuring the current inventory by the sales per day. Wherein one star measures sales and another star measures inventory, calculation of the days that inventory is on hand requires calculation of measures from both the sales star and the inventory star.

The analytical server 120 accesses the measures separately from each star 300, and then performs the equivalent of an outer join on the results. The different sets of results along the hierarchical level supplied in the request and retrieved by the queries are carefully "lined up", thereby allowing the server 120 to encapsulate this knowledge and processing, and make sophisticated metrics available to the requester. The maintenance of the hierarchical levels in the metadata structures 145 associated with the various stars 300 and associated aggregate tables 130 expedites the efficient "lining up" process by allowing the analytical server 120 to quickly assess which of the available structures are available and to find the coarsest available aggregate level for those structures.

E. Invariant Metrics

Certain measures or metrics are "invariant" by dimension. For example, to calculate the metric sales per sales rep, a measure must exist for the denominator which gives the number of sales reps. Furthermore, it may be useful to look at the sales per rep metric broken down by product business unit, family, or item. If the number of sales reps is maintained in a sales forecast star, it can be accessed only by sales geography and time. However, since all reps sell all products, the measure reporting number of reps does not change whether we are looking at the business unit, family, or item level, the number of sales reps is invariant along the product dimension. Therefore, the sales forecast star is degenerate along the product dimension. The analytical server is equipped with knowledge of measures which are invariant with respect to certain dimensions. Providing this knowledge to the analytical server allows a single value to be obtained as the invariant measure in the metric calculation, regardless of the level of the dimension to which the measure is invariant.

F. Allocation Metrics

An allocation metric is a metric containing a measure that is not defined at the lowest dimension level, but which is useful and desirable to allocate a value for the metric at the lowest dimension using another measure which is definable at the lowest dimension. For example, Sales Forecast numbers may be available by Geography, Sales Rep, and Time, but not by Product Business Unit. However, suppose that Sales for the previous year are available by Product Business Unit and that it is a reasonable assumption that the breakdown of Sales by Product Business Unit will be similar to the breakdown of Sales Forecast by Product Business Unit. In such a case, the Sales Forecast by Product Business Unit can be calculated by the foregoing expression:

Allocated Forecast for Product(A)=Total Forecast*Sales for Product(A)/Total Sales In the foregoing case, the measure "Forecast Sales" is the base measure while "Sales Last Year" is known as the control measure. Additionally, it should be noted that while Sales for Product (A) is at the same level as the request, i.e., both are at the Product Business Units, Total Forecast and Total Sales are at different levels, or "allocated levels".

Figure 9:
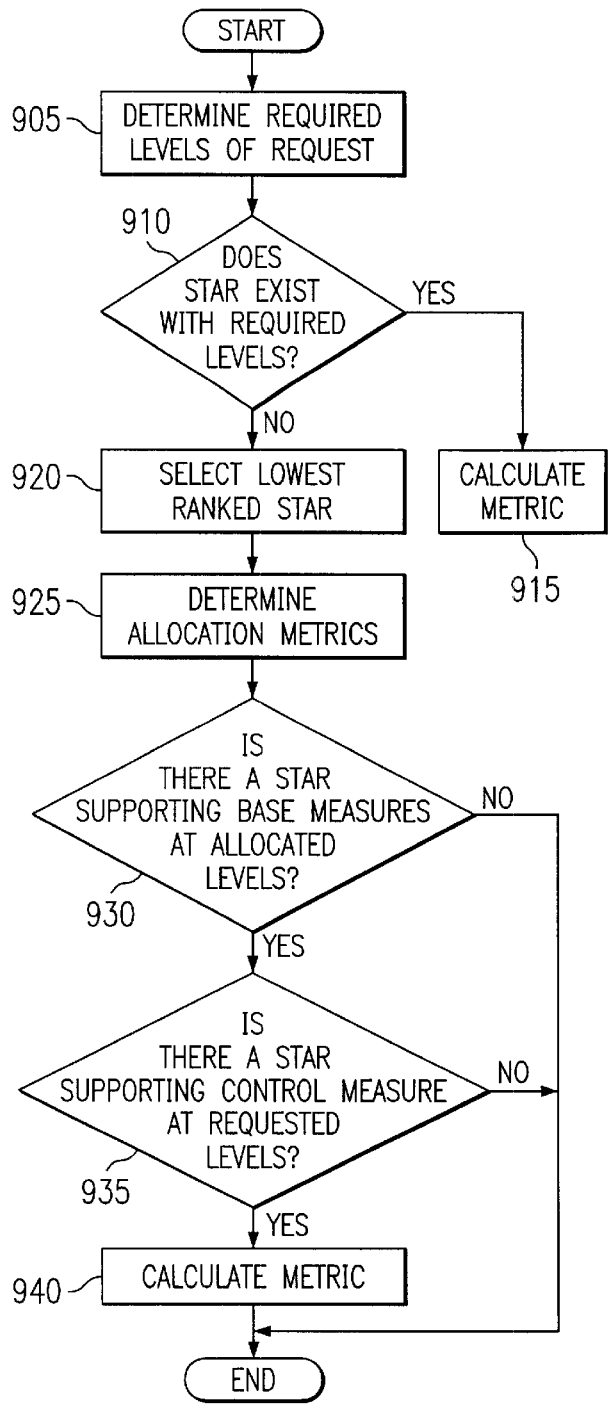
FIG. 9 is a flow diagram of the calculation of an allocation metric.

Referring now to FIG. 9, there is illustrated a flow diagram describing calculation of an allocated metric. The calculation of an allocated metric will be described using an exemplary case wherein a request is made for Forecasted Sales by Quarter, and Business Unit, across All Geographies. The supported levels of the aggregate tables 130 are described by the metadata stars in the following dimension order: Time, Product, and Geography. The Time dimension is ordered from All, Year, Quarter, Month, Week, and Date. The Product dimension is ordered from All and Business Unit. The Geography is ordered from All, Continent, Country, State, and City.

At step 905, the required levels for the request are determined. In the exemplary case, the required levels are "210." At step 910, a determination is made whether a star exists with the required levels. As an example, the star metadata structure 305 shown in FIG. 3 could be used to store, in a defined fashion in the array 310 of integers, the available hierarchical levels within a given star. If a star exists having the required levels, the metric is calculated (step 915) directly and the process is terminated. Wherein a star does not exist, the best data available for the base measure (Sales Forecast), which is simply the lowest ranked star in the stargroup, is selected (step 920).

In the exemplary case, the lowest ranked star is ranked as "303" which fails on the Product dimension. At step 925, the allocation levels are determined by taking the minimums of the required levels for the request and the levels of the star selected during step 920. The allocation levels are "200" in the exemplary case.

During step 930, an attempt is made to find a star which supports the allocation levels in the base measure, e.g., the sales forecast in the present exemplary case. During step 935, an attempt is made to find a star in the control measure (the Sales Last Year) which support the required levels for the request ("210"). Wherein a star for the base measure is found in step 930 and a star for the control measure is found in step 935, the allocated measure is calculated (step 940), thereby completing calculation of the metric. Wherein a star is not found in either steps 930 or 935, the allocated measure cannot be calculated and calculation of the metric is terminated.

III. Security

A. Dimension Level Security

Data security is provided on both a dimension level and a fact level. Each authorized user of the database can be associated with a particular security level which restricts the levels of each hierarchy which the user is permitted access. For example, regional sales managers can be permitted to only view sales at the regional level and not be authorized access to sales data at the national or worldwide level. Additionally, the users can be restricted access to a particular value of a hierarchical level. For example, a regional sales manager might be permitted to only view sales data from their region.

The dimension level security is provided by defining security groups which specify that all metric requests have to be performed as if the required level of a certain hierarchy is at least some predetermined level. The request is rejected outright if any of the levels are lower than the security levels. The security definitions can also contain rules which force certain constraints. The force constraints are dynamically substituted to a given request.

B. Fact Level Security

It may also be desirable to prevent users from viewing specific metrics. An additional two level hierarchy is defined, wherein level zero is indicative that the data should not be visible, while level one is indicative that the data should be made visible. The supported level for the added hierarchy is set at zero for each restricted metric and one for each unrestricted metric. Users who are restricted are placed in a security group that only permits access to level one of the hierarchy. Therefore, when a restricted user makes a query for the restricted metric, the security definition imposes a dimensional constraint of one for the additional hierarchy. During aggregate navigation, each of the stars will be rejected because the stars only support a level zero aggregation. For users who are permitted to access the restrict metric, the zero level dimensional constraint is imposed. However, each of the stars are support the zero level aggregation.

Although preferred embodiments have been illustrated in the accompanying drawings and described above, the claims shall not limited to the embodiments disclosed, but are capable of numerous rearrangements, modifications, and substitutions without departing from the spirit of the invention as set forth and defined by the following claims and equivalents thereof.

What is claimed is:

1. A method of operating an analytical server which is positioned between a client and a Relational Database Management System (RDBMS), the method operable to provide an interface between the client and a relational database located on the RDBMS, the relational database having fact tables, dimension tables, and metadata describing the relationships between the fact and dimension tables, wherein the fact tables include measures which can be additive or non-additive, and wherein the metadata includes a designation of which measures are additive and which measures are non-additive, the method comprising:

(a) receiving in the analytical server, from the RDBMS, at least a portion of the metadata information regarding the relational database and its organization, including information about whether certain measures are additive and information about a logical hierarchy of the fact and dimension tables;

(b) receiving in the analytical server, from the client, a metric query, the metric query calling for a metric broken down across a dimension and also calling for a roll-up of that metric;

(c) determining, based on the metric query received from the client and based on the received information from the RDBMS regarding the logical hierarchy of the fact and dimension tables and whether the measures of the requested metric are additive, which hierarchical levels of the fact and dimension tables are available in the relational database for responding to the metric query;

(d) determining at least one database query according to the available hierarchical levels of the fact and dimension tables; and (e) sending the determined at least one database query to the RDBMS whereby the metric query can be responded to by the analytical server based on the responses of the RDBMS to the determined at least one database query, whereby the response is tailored to the most efficient hierarchical level necessary depending on whether the measures of the requested metric are additive, wherein the designation of which measures are additive and which are non-additive further specifies by dimension which measures are additive and which are non-additive.

2. The method of claim 1 wherein the determining of the at least one database query takes into account whether the requested metric is additive specifically across the requested dimension.

3. A method of operating an analytical server which is positioned between a client and a Relational Database Management System (RDBMS), the method operable to provide an interface between the client and a relational database located on the RDBMS, the relational database having fact tables, dimension tables, and metadata describing the relationships between the fact and dimension tables, the method comprising:

(a) receiving in the analytical server, from the RDBMS, at least a portion of the metadata information regarding the relational database and its organization, including information about a logical hierarchy of the fact and dimension tables;

(b) receiving in the analytical server, from the client, a metric query;

(c) determining, based on the received information regarding the logical hierarchy of the fact and dimension tables and based on the metric query received from the client, which hierarchical levels of the fact and dimension tables are available in the relational database for responding to the metric query, wherein at least one measure within the fact and dimension tables are insufficiently fine in a requested dimension in order to respond to the metric query;

(d) determining, according to the available hierarchical levels of the fact and dimension tables, at least one metric by which the at least one measure which was unavailable at the requested fineness can be approximated by the using the measure along the requested dimension at a higher hierarchical level than the one needed to directly respond to the metric query; and (e) sending a database query to the RDBMS based on the determining of available hierarchical levels of the fact and data tables and upon the at least one higher hierarchical level for the needed measure along the dimension which was unavailable at the needed hierarchical level.

4. The method of claim 3 wherein the measure which was unavailable at the requested fineness was a time measure.

5. The method of claim 4 wherein the requested hierarchical level along the time dimension was for a measure broken down by month.

6. The method of claim 5 wherein to approximate the measure on the monthly basis, the measure broken down by quarter is divided by three and assigned to the requested months.

7. The method of claim 6 wherein to approximate the measure on the monthly basis, the measure is repeated at the requested months.

8. The method of claim 7 wherein the measure was an average.

* * * * *